Feb. 20, 1934.   M. EWALD   1,948,459
CORING MACHINE
Original Filed Nov. 21, 1927   4 Sheets-Sheet 2

Inventor:
Mark Ewald
By / Atty.

Feb. 20, 1934.  M. EWALD  1,948,459

CORING MACHINE

Original Filed Nov. 21, 1927   4 Sheets-Sheet 3

Inventor:
Mark Ewald
By Arthur E Wallace
Atty.

Feb. 20, 1934.　　　　　M. EWALD　　　　　1,948,459
CORING MACHINE

Original Filed Nov. 21, 1927　　4 Sheets-Sheet 4

Inventor:
Mark Ewald
By Arthur C. Wallace
Att'y.

Patented Feb. 20, 1934

1,948,459

UNITED STATES PATENT OFFICE 1,948,459

CORING MACHINE

Mark Ewald, Olympia, Wash., assignor to Special Equipment Company, Portland, Oreg., a corporation of Oregon Application November 21, 1927, Serial No. 234,676
Renewed April 18, 1932

41 Claims. (Cl. 146—39)

This invention relates to coring machines and more particularly to means for effecting the removal in timed relation of the epidermis and cores from edible articles, although certain features thereof may be employed with equal advantage for other purposes.

It contemplates more especially the provision of means effective to remove the core and epidermis or either of them from edible articles and simultaneously impart a predetermined uniform shape thereto with a view of improving the appearance thereof for immediate consumption or preservation.

Edible articles of every description are now capable of being preserved in hermetically sealed containers for future consumption; in fact, the purchasing public depends largely upon canned edibles for their daily menu, and as a consequence the canning industry has grown to enormous proportions. This necessitates improved means for hastening the preparation of edibles particularly fruits for enabling the effective canning thereof.

Prior to preserving, it is essential or at least highly desirable that the core and epidermis be removed from the fruit or other edible to render it more pleasing in appearance and taste. Experience has established the desirability of peeling articles, especially fruits, prior to their preservation in that the epidermis thereof usually is unsightly and impervious to the effects of the preserving solution.

In addition, the cores of edibles are usually of pulpous texture and not pleasant to the taste. As a consequence thereof its removal serves to improve the quality. It is customary to manually peel and remove the cores from fruits or other edible articles prior to the canning thereof, but known methods have not proven entirely satisfactory in that they entail much labor, expense, and are not conducive to the preservation of articles of a predetermined uniform shape. Uniform quality and size is highly desirable in that it materially improves the appearance thereof which is important from the standpoint of marketing.

One object of the present invention is to simplify the construction and improve the operation of devices of the character mentioned.

Another object is the provision of means for removing the core from edible articles either prior to or simultaneous with the removal of the epidermis therefrom.

Still another object is the provision of means for imparting a predetermined shape to edible articles by removing the epidermis therefrom, and effect the removal of the core in a predetermined cycle of operations to render the article readily preservable.

A further object is the provision of a machine capable of receiving edible articles to effect the removal of the core therefrom prior to their discharge.

A still further object is the provision of novel article sustaining means capable of coacting with instrumentalities for effecting the removal of the core therefrom.

Still a further object is the operation of a core removing instrumentality in conjunction with article sustaining means to effect the removal of the core from an article.

A further object is the provision of epidermis severing instrumentalities in conjunction with core removing mechanism which are operable in timed sequence to impart a predetermined shape to an article as well as remove the core therefrom.

Other objects and advantages will appear from the following description of an illustrative embodiment of the present invention.

Figure 1:
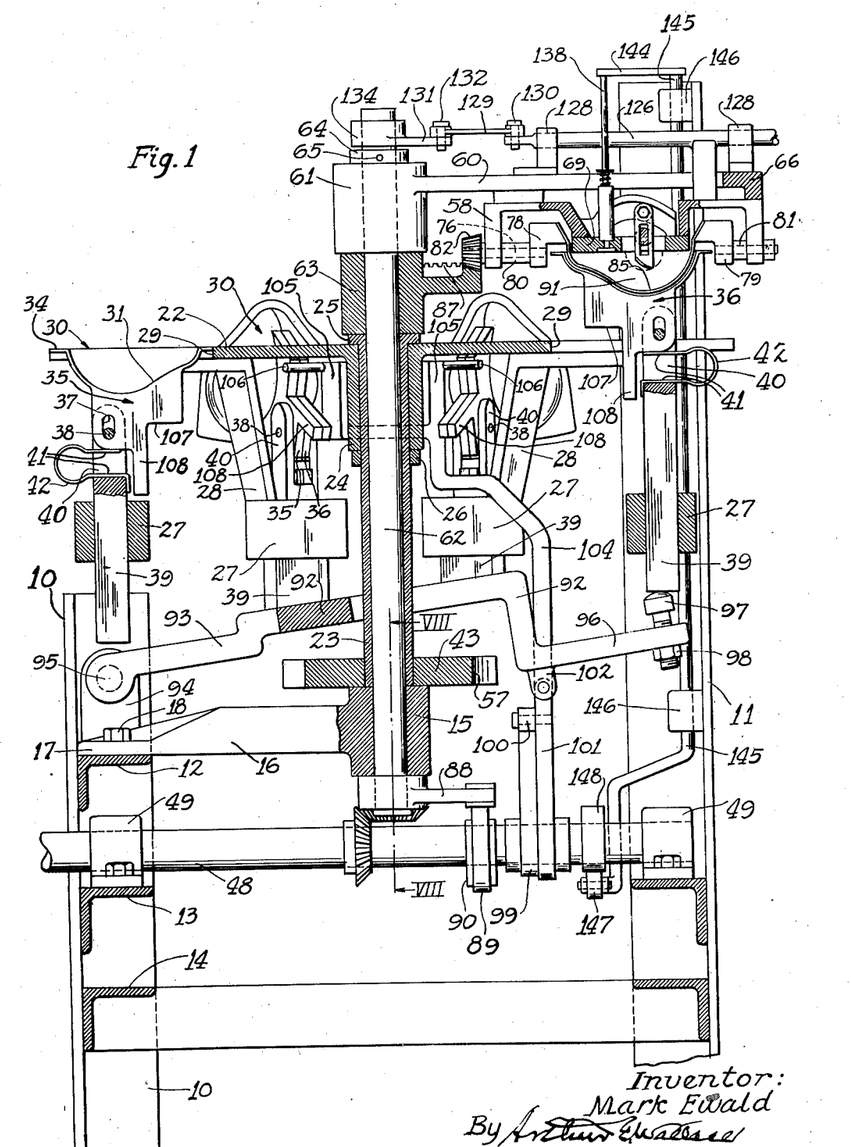
Figure 1 is a sectional view in elevation of a device embodying features of the present invention.

The structure selected for illustration comprises a frame of any suitable construction, in this instance consisting of vertically disposed angle irons 10 and 11 constituting corner sections which are maintained in fixed relation by virtue of a series of horizontally disposed rectangular plates 12, 13 and 14 fixed to the corner members in superposed relation (Figure 1).

Figure 8:
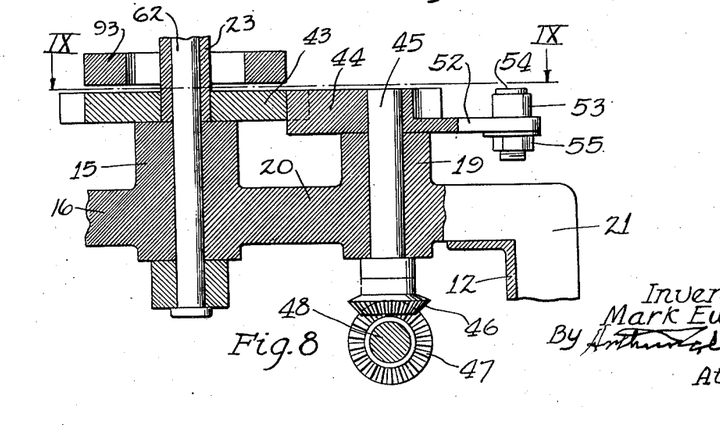
Figure 8 is a sectional view in elevation taken substantially along line VIII—VIII of Figure 1.
Figure 9:
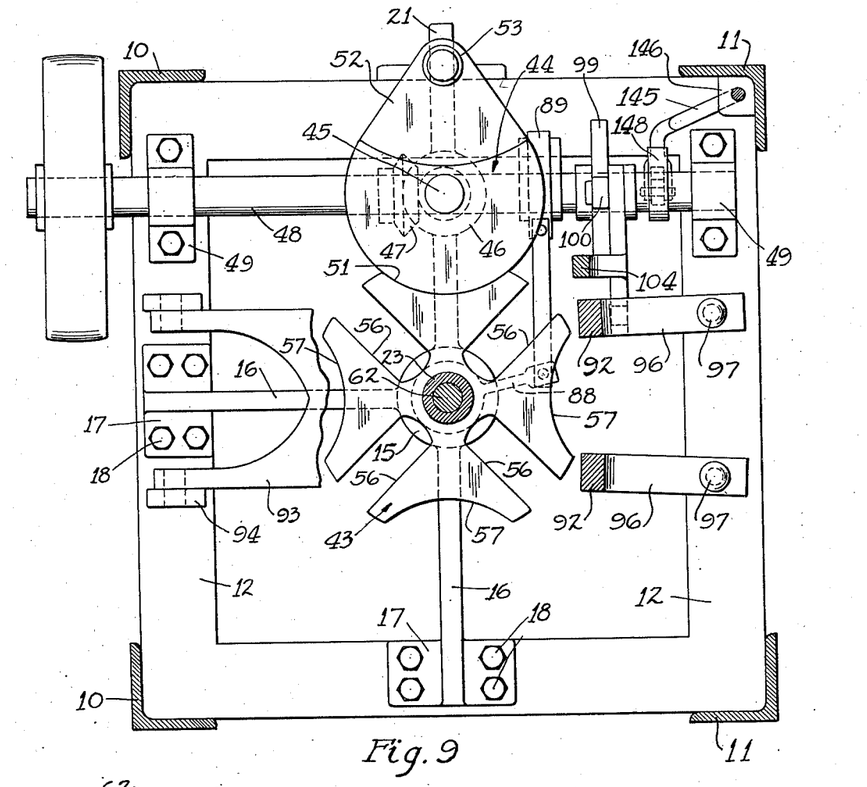
Figure 9 is a sectional view taken substantially along line IX—IX of Figure 8.

A vertically disposed bearing 15 is sustained by the plate 12 owing to its radially extending integral arms 16 which terminate in brackets 17 fixed to the plate 12 in any suitable manner such as by the fasteners 18 of standard construction. Another vertically disposed bearing 19 (Figure 8) is spaced from and formed integral with the bearing 15 through the medium of an interconnecting member 20. The bearing 19 terminates in an angular extension 21 formed integrally therewith to rest upon the plate 12 to create a three point suspension (arms 16 and 21) of the spaced vertically disposed bearings 15 and 19 as will appear from the showing in Figure 8.

A horizontally disposed table 22 of substantially circular configuration is fixed to a tubular sleeve 23 which rests upon the bearing 15 in axial alignment therewith so that the axial bore provided therein would be in communicating relation, the table 22 having an axially extending hub 24 which impinges against the peripheral shoulder 25 provided at the extremity of the tubular sleeve 24. Any suitable supporting means may be employed to retain the table 22 in its desired vertical position, this being accomplished in this instance by a collar 26 detachably fixed to the tubular sleeve 23 to support the axial hub 24 to the table 22 thereby effecting movement of the table 22 in unison with the tubular sleeve 23.

A series of circumferentially spaced bearings 27 are disposed beneath the table 22, they being suspended therefrom by means of the brackets 28 formed integrally therewith for attachment to the tube in any suitable manner. The face of the table is provided with a series of openings 29 of irregular shape spaced about the periphery thereof in this instance in closely associated pairs disposed on normally related axes of the circular table 22 to define eight openings therein in vertical axial alignment with the bores of the bearings 27 supra. Each of the openings 29 is provided with a correspondingly shaped article sustaining member 30 having a concavity 31 therein of any desired configuration which in this instance simulates the shape or contour of a pear, it being obvious that other shapes may be employed to accommodate different objects therein.

The article sustaining members 30 are preferably of segmental construction consisting of complemental sections 32 and 33 which terminate in a continuous peripheral flange 34 having a shape corresponding to the opening 29 provided in the surface of the table 22 for disposition therein. Each of the segments 32 and 33 have downwardly extending contacting shanks 35 and 36 respectively disposed adjacent each other for relative slidable movement. The adjacent contacting shanks 35 and 36 are provided with normally aligned elongated apertures 37 which receive a pin 38 therethrough to render the segments movable with respect to a support 39 which is forked at the ends thereof to define spaced confronting furcations 40, the support 39 being reciprocal in the bearings 27. The contacting shanks 35 and 36 are confined intermediate the furcations 40 by virtue of the pin 38 which bridges the furcations 40 to sustain the segments 32 and 33, in this instance constituting the article sustaining member 30, in position.

As shown, the segments 32 and 33 are normally maintained in complemental relation by virtue of individual yieldable springs in this instance comprising flat metallic members shaped to define confronting portions 41 inter-connected by substantially circular portions 42 effective to repel the confronting portions 41 to normally urge the segments 32 and 33 upwardly to sustain an article therein. It is to be noted that individual springs 41 are employed to impinge against each of the shanks 35 and 36 so that the respective segments 32 and 33 may be moved relative to each other against the action of the spring supporting means 41 for reasons which will appear more fully hereinafter.

Intermittent motion is imparted to the table 22 by virtue of a Geneva cam 43 fixed to the tubular shaft 23 at the lower extremity thereof in contacting relation with the vertically extending bore 19 to cooperate with a cam 44 (Figure 8) fixed to a stud shaft 45 journaled in the bearing 19. The stud shaft 45 is driven by a bevel gear 46 fixed to an extremity thereof for meshing engagement with a correspondingly shaped bevel gear 47 fixed to a driving shaft 48 journaled in split bearings 49 fixed to the plate 13 supra. A pulley or collar may be fixed to the extremity of the shank 48 to enable any suitable power means to be harnessed thereto to effect rotation of the shank 45 carrying the cam 44 thereon. The cam 44 is composed of a substantial portion of the circle which terminates in a reduced extension 52 having a face thereof disposed beneath the plane of the Geneva cam 43.

The reduced portion 52 has a roller 53 journalled in a pin 54 detachably fixed to the extremity of the portion 52 by virtue of a nut 55, the roller 53 being disposed in the plane of the Geneva cam 43 for periodic coaction with the normally disposed slots 56 provided therein to correspond with the spacing of each pair of article sustaining members 30 supra. Intermediate the normally disposed slots 50, in this instance, four, are arcuate surfaces 57 which coact with the circular portion 51 of the cam 44 to maintain the Geneva cam 43 against rotation during the interval defined by the circumferential extent of the circular segment on the cam 44. The table 22 will be moved a quarter of a revolution each time the roller 53 is projected within a slot 56, it being held against movement upon engagement of the circular portion 51 with the arcuate surfaces 57 of the Geneva cam 43, thereby imparting intermittent predetermined movement of the table 22.

Edible articles such as fruit, in this instance pears, are first sliced in half for disposition in the concavities 31 of the sustaining members 30, the concavities being formed to correspond with the exterior shape of the article placed therein. To remove the epidermis from the articles placed in the sustaining members 30, it is first desirable to maintain the articles therein against movement. In the present embodiment, a pair of interconnected angularly related, radially extending brackets 58 and 59 are suspended from a radially extending support 60 which terminates in a bearing 61 having a vertical bore at one extremity thereof to receive an axially extending shaft 62 journalled in the tubular sleeve 23, supra.

Figures 2, 3:
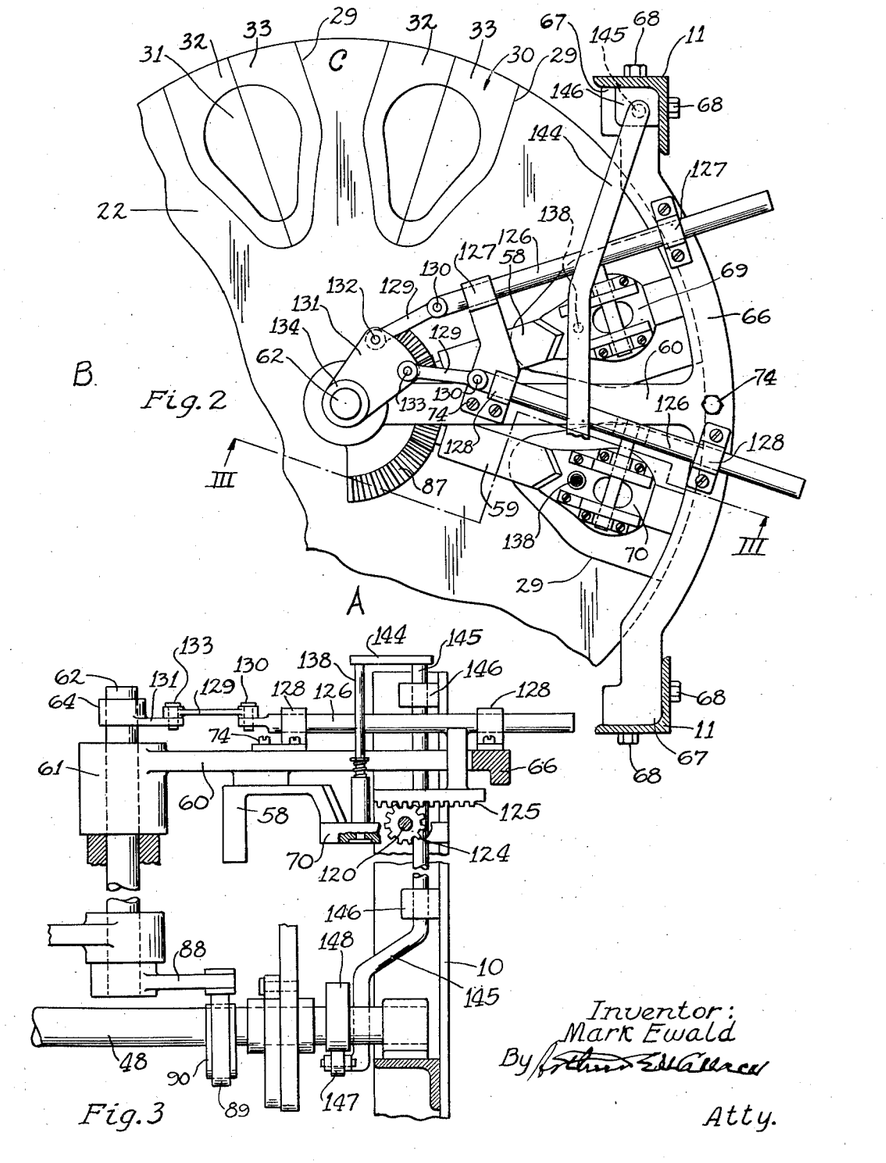
Figure 2 is a fragmentary plan view of the device disclosed in Figure 1, the core actuating mechanism being particularly shown therein.
Figure 3 is a sectional view taken substantially along line III—III of Figure 2.

As shown, the shaft 62 projects entirely through the bearing 61 which rests upon a spacer bearing 63 introduced between the bearing 61 and the shoulder 25 of the tubular shaft 23. The extremity of the shaft 62 is provided with a collar 64 detachably fixed thereto by virtue of a set screw 65 of standard construction. The other extremity of the support 60 is integrally associated with an arcuate extension 66 intermediate the ends thereof, the extensions 66 having angularly related extremities 67 to cooperate with the interior of the channel supports 11 (Figure 2) which serve as a support therefor owing to the fasteners 68 detachably associated therewith.

Figures 4, 5:
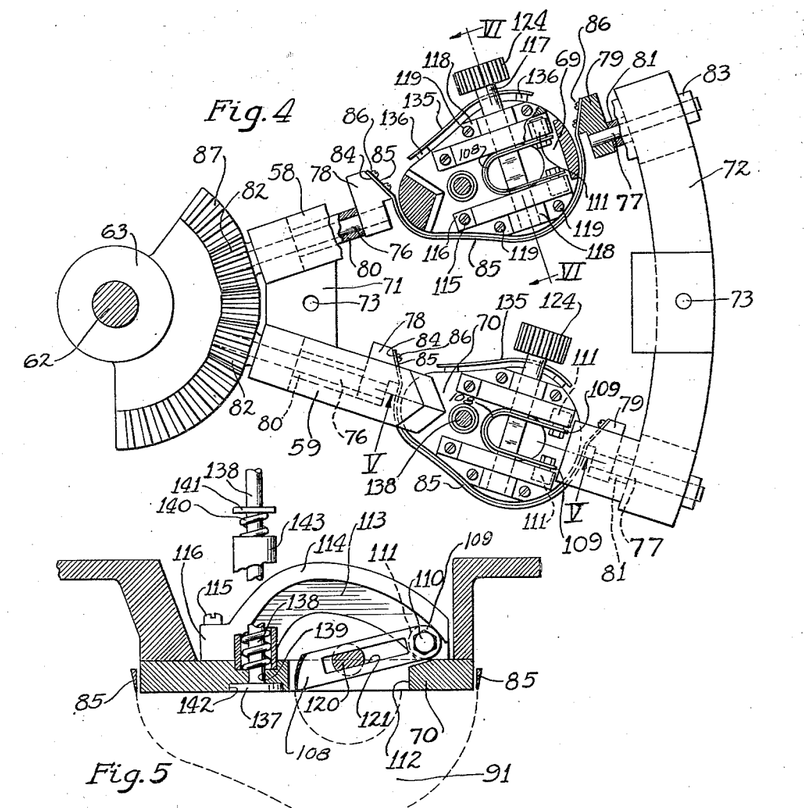
Figure 4 is a fragmentary plan view of the epidermis severing and core removing instrumentalities.
Figure 5 is a sectional view taken substantially along line V—V of Figure 4.

It is to be noted that the brackets 58 and 59 are so related as to correspond with the spacing of each pair of article sustaining members 30, there being provided substantially flat pads 69 and 70 (Figures 2 and 3) on the underside of the brackets intermediate the ends thereof in superposed alignment with the concavities 31 of the article sustaining members 30 when positioned in registry therewith. The pads 69 and 70 are shaped to correspond with the peripheral edge of the concavities 31, they being slightly smaller in size with respect thereto to permit the epidermis severing means to travel therearound. It is to be noted that the brackets 58 and 59 are maintained in spaced relation by arcuate spacing elements 71 and 72 fixed thereto near the extremities thereof (Figure 4) with apertures 73 therein to enable the securing thereof to the supporting bar 60 by means of suitable fasteners 74.

Axially aligned stud shafts 76 and 77 are journalled in each of the brackets 58 and 59, to receive mounting means 78 and 79 on the confronting extremities thereof, the mounting means being maintained in spaced relation with respect to the brackets 59 by virtue of tubular spacer elements 80 and 81. The free extremity of the shafts 76 are provided with bevel gears 82 which constitute a means for imparting rotary motion to the mounting means 78 and 79 as will appear hereinafter. The free extremity of the stud shafts 77 is provided with a collar 83 to prevent axial movement of the shaft 77 within its bearing.

The mounting means 78 and 79 are provided with inclined diverging surfaces 84 to receive thereon a substantially flat metallic ribbon 85 secured thereto by means of the fasteners 86 of any suitable construction. The strap 85 is bent intermediate the ends thereof to assume a shape corresponding with the interior contour of the concavities 31 whereby the ribbon 85 constitutes a cutter to sever the epidermis of the articles sustained within the concavities 31 of the members 30, the edges of the ribbon 85 being ground or otherwise shaped to enable the severance of the epidermis from an article. The pads 69 and 70 are so spaced as to bring a pair of article sustaining members 30 in registry therewith responsive to the intermittent motion imparted to the table 22 by the mechanism described above.

Figure 6:
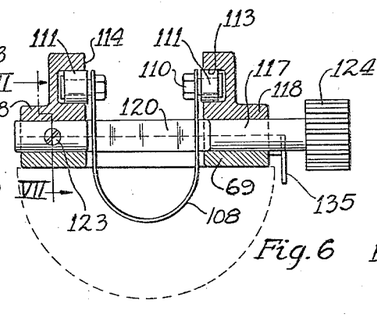
Figure 6 is a sectional view taken substantially along line VI—VI of Figure 4.
Figure 7:
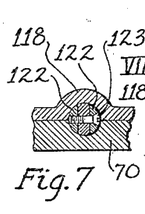
Figure 7 is a sectional view taken substantially along line VII—VII of Figure 6.

The epidermis severing means, constituting in this instance two metallic ribbons 85 mounted on each of the brackets 58 and 59, are oscillated in timed relation with the movement of the table 22 so as to coact with the interior of the concavities 31 of the article sustaining members 30 during the period of rest of the table 22. At this time the sustaining members are in registry with the pads 69 and 70. The pads 69 and 70 serve to maintan the fruit or other articles contained in the sustaining members, against movement in that the latter are elevated to cause the fruit to contact with the pads 69 and 70 (Figure 6) prior to the operation of the severing means 85. Movement is imparted to the severing means by virtue of the bevel gears 82 fixed to the stud shafts 76 journalled in each of the brackets 58 and 59, the gears 82 being in mesh with a mutilated gear 87 integrally or otherwise associated with the spacer bearing 63 which is fixed to the shaft 62, supra.

The shaft 62 extends downwardly and terminates in a crank arm 88 fixed to the extremity thereof. The crank arm 88 has a cam follower 89 fixed thereto to co-act with a cam 90 fixed to the shaft 48 to impart oscillatory movement to the shaft 62 in proper timed relation with respect to the intermittent movement of the table 22 so as to actuate the epidermis severing means 85 at the proper time, this being the rest period of the table 22 which, as described above, is intermittently rotated.

Just prior to the actuation of the epidermis severing means 85, a pair of article sustaining members in the vicinity of the pads 69 and 70 are raised to co-act therewith in the manner disclosed in Figure 1, so as to hold the fruit or other articles 91 clamped between the sustaining concavities 31 and their respective pads 69 and 70. This is accomplished in this instance by virtue of the lever 92 which has furcations 93 at one extremity thereof cooperating with the upstanding lugs 94 fixed to the rectangular plate 12 supported by the corner members 11, supra. A pin 95 projects through aligned apertures in the furcations and lugs 93 and 94, respectively, to enable pivotal movement of the lever 92, so that the other furcated extremities 96 thereof will co-act with the guide rods 39 of each of the sustaining members 30 disposed in registry with the pads 69 and 70. The furcated extremities 96 are preferably provided with stops 97 adjustably fixed to the furcations 96 by virtue of threaded nuts 98 so that the guide rods 39 will normally contact with the stops 97 just prior to the upward movement imparted to the lever 92 responsive to the movement of the shaft 48. For this purpose the shaft 48 is provided with a cam 99 thereon to co-act with the cam follower 100 fixed to a rod 101 which is pivoted to a lug 102 constituting a part of the furcated lever 92. As shown, the cam 99 is of such shape as to vertically reciprocate the guide rods 39 of the sustaining members 30 in registry with the pads 69 and 70 to clamp the articles therebetween at that particular time.

It is important to note that simultaneous with the operation of the epidermis severing means 85, its mounting means 78 and 79 coact with the peripheral flange 34 of the sustaining members 30. The segments thereof will thus be individually depressed during the movement of the severing means therein to enable the epidermis to be removed from that portion of the article while the other segment or segments sustain the fruit in its desired position, so that the knife or severing instrumentality in passing from one segment to the other will depress the approaching segment simultaneous with the rise of the formerly depressed segment due to the urge of the spring 41. Thus the complementary segment will be depressed while the other has risen to permit the knife to move therein without obstruction thereto, the article being continuously sustained against the pads.

Subsequent to the removal of the epidermis from each half of the articles sustained in the concavities 31 disposed in registry with the pads 69 and 70, the peeled fruit is moved to the next station where a lever 104 which is operatively connected to the lever 92, imparts pivotal movement to the sustaining members 30 having the peeled fruit confined therein. This is accomplished by furcations 105 on the lever 104, which are provided with normally disposed pins 106 thereon capable of engagement with a shoulder 107 formed on the shanks 35 and 36 of the article sustaining members 30. As shown, the shanks 35 and 36 of the complementary segments constituting the sustaining members 30, terminate in downwardly extending lugs 108 disposed adjacent the shoulder 107 so that the pins 106 will ride thereover in their downward movement to assist the spring 41 in returning the sustaining members 30 to their normal position to receive other articles therein to be peeled in a manner described hereinabove.

With the arrangement of parts above described, the fruit or other articles are first sliced in half, and each portion thereof is placed in the concavities 31 of the sustaining members 30 which would be at station A or B, or both (Figure 2), if said figure were a full plan of the device instead of a fragmentary view whereupon the sustaining members at station B will be intermittently moved in registry with the pads 69 and 70. At this position the cam 99 on the shaft 48 will lift the lever 92 to effect the rise of the guide members 39 to which the sustaining members are operatively connected for effecting the engagement of the articles with the pads 69 and 70.

The knives or epidermis severing means 85 will thereupon be actuated to swing within the concavities 31 so that the segments thereof will be individually depressed simultaneously with the removal of the epidermis from the article, the complementary segments being effective to sustain the article in spaced relation to the depressed segments. The sustaining members contained in the peeled articles are thereby moved to the next station C, at which point the lever 104 moves upwardly to effect the inclination of the sustaining members (Figure 1) from which the articles are discharged into a suitable container (not shown). Thus it will be apparent that means have been provided to remove the epidermis from articles and simultaneously impart a predetermined uniform shape thereto depending upon the contour of the severing ribbon 85.

Obviously, articles of any configuration or shape may be peeled by merely changing the contour of the sustaining members 30 and effecting a corresponding change in the severing means, this being possible by merely detaching the severing instrumentality 85 from the mounting members 79. Should it be necessary to change the space therebetween, another spacing sleeve 80 of different length may be substituted, thereby enabling the desired adjustability. Further, the entire structure composed of the angularly disposed brackets 58 and 59 (Figure 4) may be removed as a unit should it be desired to substitute another unit therefor. As shown, the sustaining members 30 are also readily removed to enable the substitution of members of various configuration therefor in the event other articles of different shapes are to be peeled.

Prior to the release of the articles 91 from their respective sustaining members 30 confronting the pads 69 and 70, the core of the article is removed substantially simultaneously with the operation of the epidermis severing instrumentality 85. Coring means are provided in association with each of the pads 69 and 70, the coring means comprising an arcuate blade 108 which is provided at the confronting extremities 109 thereof with studs 110. The studs 110 carry rollers 111 to effect movement of the blade through an aperture 112 provided in each of the pads 69 and 70. The rollers 111 are mounted for guided movement in curved grooves 113 provided in the confronting surfaces of plates 114 mounted in pairs on each of the pads 69 and 70, they being secured thereto by studs 115 projecting through the flanged extremities 116 thereof.

Rotation is imparted to the coring blades 108 by virtue of driving shafts 117 journaled in suitable bearings 118 fixed adjacent to the plates 114 on the pads 69 and 70 by means of suitable fasteners 119. The shafts 117 are substantially rectangular in cross-section as at 120 to project through correspondingly shaped slots 121 provided in the confronting surfaces of the blade 108. The extremities of the shafts 117 are provided with arcuate shims 122 which are fixed to the flat surfaces 120 on either side thereof owing to a set screw 123 to impart a substantially circular configuration conforming with the major portion of the shaft 117, thereby enabling the latter to be introduced in its bearings for rotation therein. The other extremities of the shaft 117 carry a spur gear 124 which mesh with racks 125 suspended from bars 126 which are reciprocally mounted within suitable aligned guides 127 and 128 fixed to the brackets 58 and 59, respectively.

The converging extremities of the bars 126 have links 129 pivoted thereto as at 130, the other extremities of the links 129 being pivoted to a crank arm 131 at spaced points 132 and 133. The crank arm 131 is integrally associated with a boss 134 fixed in any suitable manner to a shaft 62 which imparts oscillatory movement thereto in unison with the gear segment 87 in a manner described hereinabove. Obviously, oscillatory movement of the crank arm 131 will reciprocate the bars 126 in their aligned bearings 127 and 128, thereby intermittently rotating the gears 124 secured to the shafts 117. Rotation of the shafts 117 effect movement of the rollers in their respective guides 113, thereby revolving the coring blade 108 in an arcuate path within the apertures 112 provided in the pads 69 and 70. Such movement of the coring blade 108 effects the penetration thereof within the article 91 to remove the core therefrom substantially simultaneous with the operation of the epidermis severing instrumentalities 85.

To preclude movement of the article 91 in the event the coring mechanism 108 removes the pulpous core with difficulty, arcuate guards 135 conforming in contour with the periphery of the pads 69 and 70, are secured thereto in spaced relation therefrom by means of the lugs 136. As a consequence thereof, the flat surface of the previously sliced article 91 will abut against the under surface of the pad superposed thereabove, the guard 135 serving to preclude any lateral movement thereof occasioned by either the epidermis severing strap 85 or the coring blade 108. Should the fruit or other article 91 be sufficiently large to extend beyond the guards 135, then the edge thereof will penetrate the surface of the article 91 to hold it against movement; consequently, it serves as a means of preventing lateral movement of the article irrespective of its size or shape.

Articles such as fruit usually possess juices which tend or cause the article to stick to the surface of the pad due to a vacuum formed therebetween. In view thereof, the descent of the article sustaining members 30 will not always release the articles 91 from the pad, thereby precluding the successful operation of the instrumentalities. To insure the removal of the article from the pad responsive to the descent of the sustaining member 30 cooperating therewith, plungers are provided to positively insure the separation of the article 91 from its respective pad simultaneous with the descent of the sustaining member 30.

In the present embodiment, each of the pads 69 and 70 are provided with plungers 137 having stems 138 fixed axially thereto for reciprocation within suitable bores 139 provided in the pads along a median line thereof. Spiral springs 140 envelop the stems 138 to impinge against a circular stop 141 fixed to the stem 138 to enable the spring to create an urge thereon for normally maintaining the plungers 137 within correspondingly shaped depressions 142. The depressions 142 are provided in the under surface of the pads in communication with the bores 139 which serve to receive the stem 138 therein.

Cylindrical guards 143 are fixed to the pads 69 and 70 to receive the spring 140 with the stem 138, thereby insuring the positive retraction of the plunger 137 within its seat 142. The descent of the plungers 137 against the urge of the springs 140 is effected by means of a bar 144 which is superposed above the stems 138. The bar 144 is fixed to a rod 145 mounted for reciprocation in a vertical direction in suitable guides 146 fixed to one of the corner members 11. The lower extremity of the rod 145 is bent to carry a roller 147 having the axis thereof disposed in a horizontal direction to normally contact with a cam 148 fixed to the driving shaft 48. The springs 140 which envelop the stems 138, normally maintain the roller 47 in contact with the cam 148 to effect the depression of the plungers 137 substantially simultaneous with the descent of the article sustaining means 30 disposed beneath the pads 69 and 70, thereby forcefully and positively insuring the release of the article 91 from its respective pad for descent with its sustaining member 30 within which it is disposed.

With the arrangement of parts above described it will be apparent that a novel mechanism is provided to effect the severance of the epidermis from articles and simultaneously remove the core therefrom to prepare the articles for preservation. The articles are preferably first sliced in halves to create a flat surface for coaction with the pads 69 and 70 responsive to the successive timed ascent of the sustaining members 30. The coaction thereof with the pad 69 and 70 maintains the articles stationary during the operation of the instrumentalities. The various instrumentalities coact with each other to remove the epidermis, core the article, impart a predetermined shape thereto, and effect the delivery thereof to any desired container. It is to be noted that the coring and epidermis severing means may be independently operable, and their timed sequence varied to meet the demands of commercial practice.

Various changes may be made in the embodiment of the invention herein specifically described without departing from or sacrificing any of the advantages thereof as defined in the appended claims.

I claim:

1. The combination with article sustaining means having a wall in contact with the surface of an article therein, of epidermis severing means, and means for urging such article from contact with said wall.

2. The combination with a fruit sustaining means having a wall in contact with the surface of a fruit contained therein, of severing means adjusted for operative engagement with such fruit, and means for urging such fruit out of contact with said wall.

3. The combination with an article sustaining means shaped to enclose an article, of severing means for operative engagement with such article when in said sustaining means, and means upon a wall of said sustaining means for urging said article out of contact with said wall subsequent to the operation of said severing means.

4. In combination, means for sustaining an article in a predetermined position, epidermis severing means conforming in contour with and adapted to follow the surface of said sustaining means, coring means operating in a direction normal to the movement of said epidermis severing means, and means for simultaneously but independently actuating said severing and said coring means to remove the epidermis and core from an article.

5. In combination, a pad having an aperture therein, article sustaining means confronting said pad, means for effecting relative movement between said pad and sustaining means to confine an article therebetween, a support for a coring means on said pad, coring means mounted for rotative movement about and for sliding movement along said support, a guide for said coring means whereby it is projected through said aperture in an arcuate direction bisecting the axis of fruit in said sustaining means, and means for actuating said coring means.

6. In combination, an article sustaining member, a knife of U-shape, a rotatable support upon which the legs of said knife are disposed for movement in the direction of their length, guide means for said knife, and a prime mover for said support whereby by the interaction of said support and guide means the cutting edge of said knife is forced into and out of said article sustaining member in an arcuate path.

7. In combination, means for sustaining a fruit in a predetermined and stationary position, coring means having a movement longitudinally of the core of a fruit in said sustaining means and disposed centrally of said sustaining means, and means for actuating said coring means to enter the fruit at one end of said core and be discharged at the other end of said core to remove the core from a fruit.

8. In combination, a pad, article sustaining means confronting said pad, means for effecting relative movement between said pad and said sustaining means to confine an article therebetween, coring means having a horizontal axis transverse to the axis of fruit in said sustaining means and associated with said pad, and means for actuating said coring means to remove the core from the article.

9. In combination, a pad, article sustaining means confronting said pad, means for effecting relative movement between said pad and said sustaining means to confine an article therebetween, coring means associated therewith, a paring knife, and means for actuating said coring and paring knife during the retention of said article between said pad and said sustaining means.

10. In combination, a pad having an aperture therethrough, article sustaining means confronting said pad, means for effecting relative movement between said pad and said sustaining means to confine an article therebetween, an arcuate blade journaled upon a horizontal axis transverse to the axis of fruit in said sustaining means and for movement through said aperture, and means for actuating said blade relative to the article to remove the core therefrom.

11. In combination, a pad having an aperture therethrough, article sustaining means confronting said pad, means for effecting relative movement between said pad and said sustaining means to confine an article therebetween, an arcuate blade journaled for movement through said aperture and revolving on an axis parallel to the flat surface of fruit in said sustaining means, epidermis severing means conforming in shape with the contour of said sustaining means and having an axis in the same plane but transverse to the axis of said blade, and means for actuating said blade and epidermis severing means to remove the core and epidermis from the article during the retention thereof between said pad and sustaining means.

12. In combination, relatively movable members for supporting an article therebetween, epidermis severing means of predetermined shape, core removing means, the epidermis severing means and core removing means having axes in the same plane perpendicular to each other, and means for effecting movement of said epidermis severing and core removing means to remove the epidermis and core from the article.

13. In combination, an article sustaining member, a metallic strip mounted for movement relative to an article associated therewith, another metallic strip of predetermined shape and mounted for movement on an axis normal to that of said first referred to strip also for movement relative to such article, and means for actuating said strips to impart a predetermined shape to such article and remove the core therefrom.

14. In combination, a pad, article sustaining means confronting said pad, means for effecting relative movement between said pad and sustaining means to confine an article therebetween, coring means associated therewith, means for actuating said coring means to remove the core from the article, and means for effecting the release of the article from the pad subsequent to coring the article.

15. In combination, a pad, article sustaining means confronting said pad, means for effecting relative movement between said pad and sustaining means to confine an article therebetween, coring means associated therewith, means for actuating said coring means to remove the core from the article, a plunger yieldably carried by said pad to confront the article in association therewith, and means operable to depress said plunger against the article to effect the release thereof when said sustaining means recedes from said pad.

16. The combination with successive article sustaining means of predetermined shape, of epidermis severing means, coring means operative independent of said epidermis severing means, and means for actuating said severing and coring means in periodic timed relation with respect to one another.

17. The combination with successive article sustaining means of predetermined shape, of epidermis severing means operating within said sustaining means, coring means also operating within said sustaining means, and means for actuating said severing and coring means in periodic timed relation in respect to one another.

18. The combination with successive article sustaining means of predetermined shape, of epidermis severing means operating in one direction relative to fruit in said sustaining means, coring means operating in said sustaining means in a direction normal to the direction of said severing means, and means for actuating said severing and coring means in periodic timed relation relative to one another.

19. The combination with successive article sustaining means of predetermined shape, of epidermis severing means correspondingly shaped to coact with the interior of said sustaining means, coring means operatively associated with said sustaining means, means for actuating said severing and coring means in periodic timed relation with successive sustaining means, means for discharging the sustaining means subsequent to the coaction of said severing and coring means therewith, and means for urging the article from contact with the wall of said sustaining means.

20. The combination with successive article sustaining means of predetermined shape, of epidermis severing means adapted to coact therewith, means for actuating said severing means in periodic timed relation with successive sustaining means, means for discharging said sustaining means subsequent to the coaction of the severing means therewith, and means for urging the article from the wall of said sustaining means.

21. The combination with successive article sustaining means of predetermined shape, of core severing means adapted to coact therewith, means for actuating said severing means in periodic timed relation with successive sustaining means, means for discharging said sustaining means subsequent to the coaction of the severing means therewith, and means for urging the article from the wall of said sustaining means.

22. The combination with a frame, of article sustaining means movably carried by said frame, a pad having an aperture therein and fixed to said frame in spaced relation with said sustaining means, means for selectively causing the approach of said sustaining means toward said pad to confine an article therebetween, an arcuate coring blade journaled for movement within said aperture to penetrate an article, cam means for guiding said coring blade, and means for actuating said blade for guided movement by said cam means.

23. Fruit treating apparatus comprising a cup and pad relatively movable to one another, said pad comprising sections adapted to be aligned to provide a single plane face, one of said sections being movable relatively to the other in a direction normal to such plane face.

24. In a fruit treating apparatus, a fruit holding device in combination with a pad comprising sections, each of said sections having a fruit engaging face parallel to the fruit engaging face of the other sections, and one of said sections being movable relatively to another in a path normal to the face of said pad.

25. In the fruit treating apparatus, a cup, a pad comprising sections, each section having a fruit engaging face, all of said fruit engaging faces being parallel to one another and being movable into alignment to provide a single flat fruit engaging surface, and a spring for urging one of said sections away from another section.

26. In fruit treating apparatus, a cup, a pad having a recess in the face thereof, means for moving said cup and pad relatively, a plunger in said recess, and a spring for urging said plunger relatively to said pad.

27. A fruit treating device comprising a cup, a pad, said cup and pad being relatively movable, said pad comprising sections, each of said sections having a fruit engaging face and said faces being movable into a single flat plane, one of said sections being movable relatively to the other, and a spring for urging movement between said pad sections.

28. The fruit treating apparatus described in claim 27, in combination with means for moving said sections of the pad relatively to one another independently of the urge of said spring.

29. In combination, an article sustaining cup having a concavity corresponding in shape with an article receivable therein, an epidermis severing means shaped to correspond with said concavity, means for holding the article in said cup comprising a yieldably mounted pad, and means for advancing said cup to proximity to said pad.

30. In a device for treating halved fruit, a fruit holding pad engaging the flat face of such fruit and comprising sections movable relatively one to another, said sections having parallel faces adapted to be alined to provide a single plane surface parallel to the flat face of the halved fruit, and means for controlling the relative movement of said sections of the pad.

31. A fruit holding cup for halved fruit, in combination with a fruit engaging pad comprising relatively movable sections, each of said sections having a plane face for engaging the flat face of a halved fruit, said plane surfaces being adapted to be alined to provide when engaging fruit a single flat fruit engaging surface, means for moving the cup relatively to said pad, and means for moving the sections of the pad relatively to one another.

32. In a fruit treating apparatus for handling halved fruit, a fruit engaging pad comprising a body having a plane face, a section also having a plane face and movable relatively to said body, the plane faces of said body and of said section being movable to provide alinement therebetween for engaging the flat face of the halved fruit, spring means for urging movement of said section into alinement with said body, and means for moving said section out of alinement with said body against the resistance of said spring means.

33. In a fruit treating apparatus for handling halved fruit, a pad for engaging the flat face of such fruit, and means for breaking the suction of the flat cross section of such fruit when held against the flat surface of said pad, comprising a plunger within said pad and having a face movable into and out of alinement with the flat face of said pad.

34. In a fruit treating apparatus handling halved fruit, a fruit holding cup for such halves of fruit, and a fruit engaging member for engaging the flat faces of such halves and comprising sections, each section having parallel faces, and said sections being movable relatively to one another to aline said parallel faces into a single plane surface when engaging a halved fruit in said cup.

35. In a fruit holding apparatus, a fruit holding cup having an edge conforming with the shape of the periphery of the flat face of a halved fruit, and a pad depending over said cup and comprising sections having parallel flat faces for engaging the flat face of such halved fruit during treatment, said pad having a section conforming to the general shape of the periphery of said fruit, the transverse dimension thereof being of less than the transverse dimension of said cup at its edge.

36. In a fruit treating device, a fruit holding apparatus, a pad associated therewith and comprising sections, said sections having faces normally parallel and adapted to be alined, a flexible supporting member for one of the sections of said pad, and means for displacing the flexibly supported section relatively to the other section of said pad.

37. In combination, relatively movable holding members for supporting an article, epidermis severing means and core detaching means of predetermined shape operable upon an article in said holding members, the epidermis severing means and the core detaching means having axes of revolution perpendicular to one another and in substantially parallel planes, and separate means for actuating said relatively movable holding members, said epidermis severing means, and said core removing means in a selected sequence.

38. In combination, a series of receptacles each having an interior contour corresponding to that of a section of fruit, means confronting said receptacles one at a time and engaging the cut face of a fruit section therein, a paring knife having a path of movement in one direction through said receptacle, a coring blade having a path of movement through said receptacle in a direction normal to the direction of movement of said paring knife, means periodically changing the relative positions of said receptacles and of said confronting means, and means operative when said confronting means is registered with one of said receptacles for actuating said paring knife and said coring blade.

39. In combination, a series of receptacles each having an interior contour corresponding to that of a section of fruit, means confronting said receptacles one at a time and engaging the cut face of a fruit section therein, a paring knife movable through said receptacles in one direction, a coring blade movable through said receptacles in a direction normal to the movement of said paring knife, means for periodically changing the relative position of said receptacles and of said confronting means, means operative while said confronting means is registered with one of said receptacles for actuating said paring knife and said coring blade, and means for discharging said receptacles one following another after said paring knife and said coring blade have passed therethrough.

40. In combination, a receptacle for a half fruit, means for moving said receptacle, means for maintaining a half fruit in said receptacle, means movable through said receptacle for paring the peel from a fruit held therein, other means for coring such half fruit moving in a direction normal to the direction of movement of said paring means in said receptacle, and means for actuating said receptacle moving means, said maintaining means, said paring means, and said coring means in timed sequence to peel and core such half fruit.

41. In combination, an open mouthed receptacle having an interior surface for supporting the periphery of a half fruit, a rotatable knife having an axis of movement in a plane parallel to the open mouth of said receptacle, the movement of the knife being in an arcuate path in proximity to the supporting surface of said receptacle, said knife removing the peel from a fruit contained in said receptacle and providing a predetermined shape for such fruit, a coring knife for detaching the core from such fruit and also having an axis of movement in a plane parallel to the open mouth of said receptacle, independent means for moving each of said knives, the axis of movement of said coring knife being perpendicular to the axis of movement of said peel paring knife, means for moving said receptacle toward and away from said knives, and means for actuating the moving means for said peeling knife and for said coring knife in selected sequence when said knives are in proximity to fruit in said receptacle.

MARK EWALD.